(12) United States Patent
Kim et al.

(10) Patent No.: US 9,753,589 B2
(45) Date of Patent: Sep. 5, 2017

(54) TOUCH SENSING SYSTEM

(71) Applicant: LG Display Co., Ltd., Seoul (KR)

(72) Inventors: Juhan Kim, Gyeonggi-do (KR); Seungkyeom Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 378 days.

(21) Appl. No.: 14/463,883

(22) Filed: Aug. 20, 2014

(65) Prior Publication Data

US 2015/0153858 A1 Jun. 4, 2015

(30) Foreign Application Priority Data

Dec. 2, 2013 (KR) .................. 10-2013-0148534

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01)

(58) Field of Classification Search
CPC ....... G06F 3/0412; G06F 3/044; G06F 3/0416
USPC ........................................................ 345/173
See application file for complete search history.

(56) References Cited

U.S. PATENT DOCUMENTS

| 7,859,521 | B2* | 12/2010 | Hotelling | G06F 3/0412 |
| | | | | 178/18.03 |
| 2012/0262384 | A1* | 10/2012 | Kim | G06F 3/0412 |
| | | | | 345/173 |
| 2014/0111446 | A1* | 4/2014 | Lee | G06F 3/0416 |
| | | | | 345/173 |

* cited by examiner

*Primary Examiner* — Abbas Abdulselam
(74) *Attorney, Agent, or Firm* — Morgan, Lewis & Bockius LLP

(57) ABSTRACT

A touch sensing system is discussed. The touch sensing system includes sensor signal lines connected to segment electrodes, sensor enable lines to which a sensor enable pulse is applied, sensor thin film transistors (TFTs) which are turned on in response to the sensor enable pulse and supply a sensing pulse from the sensor signal lines to the segment electrodes, and a touch sensing circuit which applies the sensor enable pulse to the sensor enable lines, simultaneously turns on the two or more sensor TFTs, and applies the sensing pulse to the sensor signal lines.

15 Claims, 8 Drawing Sheets

TOUCH SENSING SYSTEM

This application claims the benefit of Korean Patent Application No. 10-2013-0148534 filed on Dec. 2, 2013, the entire contents of which is incorporated herein by reference for all purposes as if fully set forth herein.

BACKGROUND OF THE INVENTION

Field of the Invention

The present invention relates to a touch sensing system.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been developed to include touch UI, voice recognition UI, 3D UI, etc. Gesture UI for sensing user's gestures has been recently applied to household appliances.

The touch UI senses an object which directly contacts a touch screen or approaches at a height close to the touch screen. The touch UI senses a user' touch input or an object's touch input using the touch screen including resistive touch sensors or capacitive touch sensors.

The touch screen may be implemented by capacitive sensing technology. The capacitive sensing technology senses changes in capacitances by a touch or a proximity of a conductive object due to a coupling effect of capacitances using capacitive sensors. The capacitive sensors are classified into mutual capacitive sensors and self capacitive sensors. The mutual capacitive sensor is formed at a crossing of two lines, which are perpendicular to each other with a dielectric layer interposed therebetween. As shown in FIG. 1, the self capacitive sensors are as many as segment electrodes C1 to Cn respectively connected to lines 10 and are formed on a touch screen. FIG. 1 shows a portion of the lines 10 connected to the self capacitive sensors. In FIG. 1, "DIC" is a display driving integrated circuit (IC) attached to a substrate of a display panel 100. The display driving IC DIC is connected to data lines and gate lines (or scan lines) formed on a pixel array of the display panel 100 and applies data to pixels.

If the m×n self capacitive sensors are arranged on the touch screen, the m×n lines 10 are necessary to individually apply a driving signal to the segment electrodes C1 to Cn. The lines 10 are connected to terminals of a touch detection IC through a flexible print circuit (FPC). A pad 11 connected to one end of each line 10 is connected to an output terminal of the FPC, and the other ends of the lines 10 are respectively connected to segment electrodes C1 to Cn. As the number of lines 10 increases, the number of output terminals of the FPC increases. Therefore, the size of the FPC increases, and the number of terminals of the touch detection IC increases.

The number of lines may be reduced to (m*n)/x using a 1-to-x multiplexer (or MUX). Further, a sensing time may be increased by dividing the capacitive sensors into a plurality of groups and simultaneously sensing the capacitive sensors belonging to each group. However, even if the above-described methods are applied, the number of lines required in the self capacitive sensors is more than the number of lines required in the mutual capacitive sensors. Because of this, when the touch screen is implemented using the self capacitive sensors, it is difficult to increase the number of segment electrodes. Hence, it is difficult to increase the size and a resolution of the touch screen.

SUMMARY OF THE INVENTION

Accordingly, the present invention is directed to a touch sensing system that substantially obviates one or more of the problems due to limitations and disadvantages of the related art An object of the present invention is to provide a touch sensing system capable of reducing the number of lines, sufficiently securing a sensing time, and being applied to a large-sized touch screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensing system comprises sensor signal lines connected to segment electrodes, sensor enable lines to which a sensor enable pulse is applied, sensor thin film transistors (TFTs) which are turned on in response to the sensor enable pulse and supply a sensing pulse from the sensor signal lines to the segment electrodes, and a touch sensing circuit configured to apply the sensor enable pulse to the sensor enable lines, simultaneously turn on the two or more sensor TFTs, and apply the sensing pulse to the sensor signal lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A display device according to an exemplary embodiment of the invention may be implemented based on a flat panel display, such as a liquid crystal display (LCD), an organic light emitting display, an electrophoresis display (EPD), and a plasma display panel (PDP). In the following description, the embodiment of the invention will be described using the liquid crystal display as an example of the flat panel display. Other flat panel displays may be used.

Figure 1:
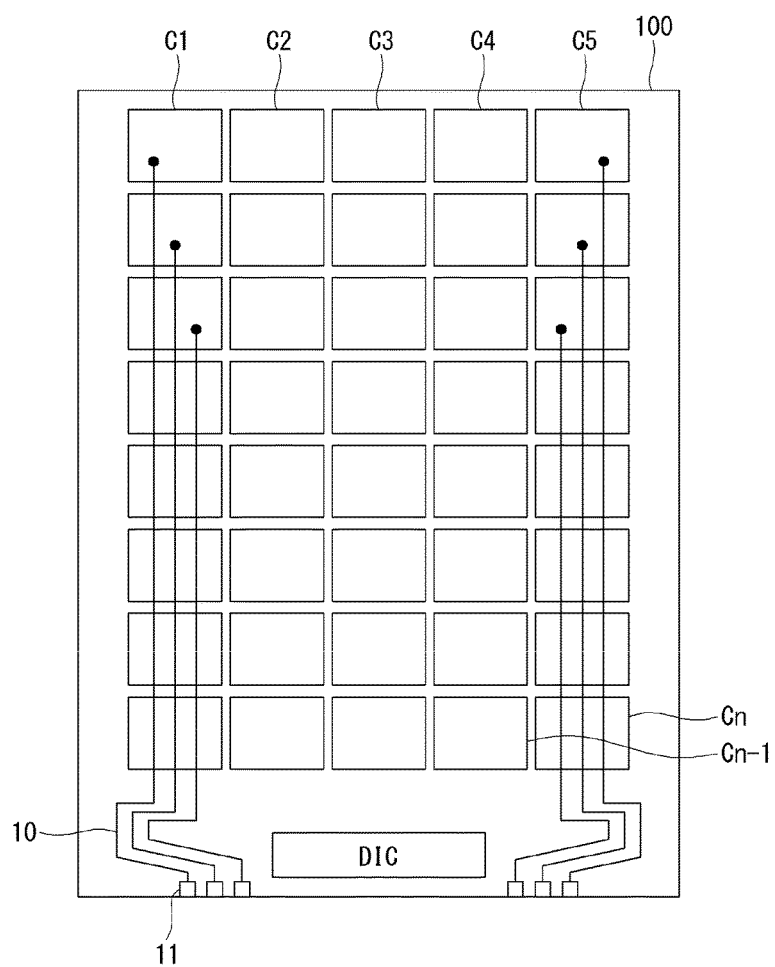
FIG. 1 shows a touch screen panel, to which related art self capacitive sensors are applied.
Figure 2:
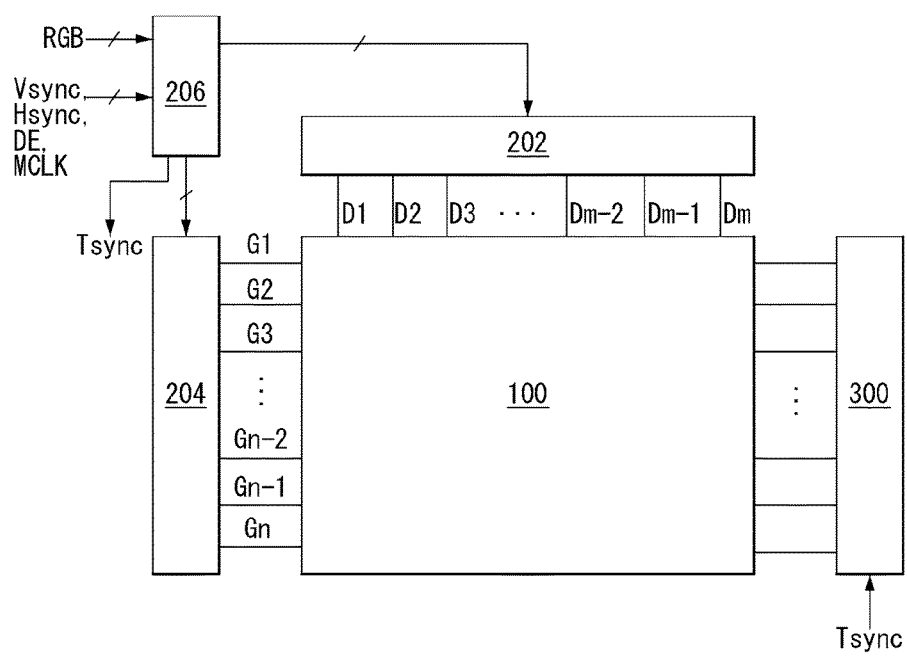
FIG. 2 is a block diagram of a display device according to an exemplary embodiment of the invention.
Figure 3:
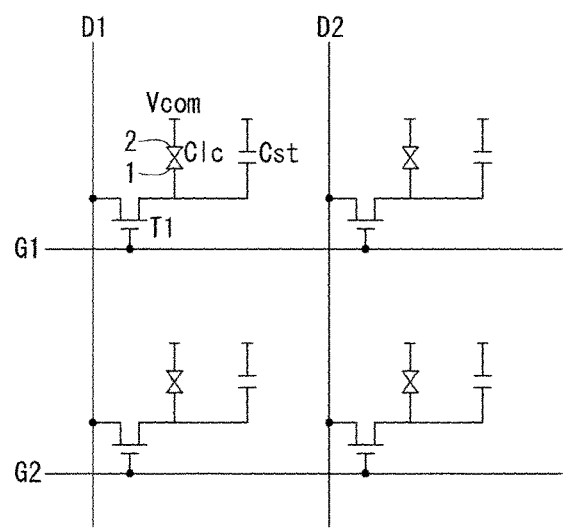
FIG. 3 is an equivalent circuit showing a pixel of a liquid crystal display.
Figure 4:
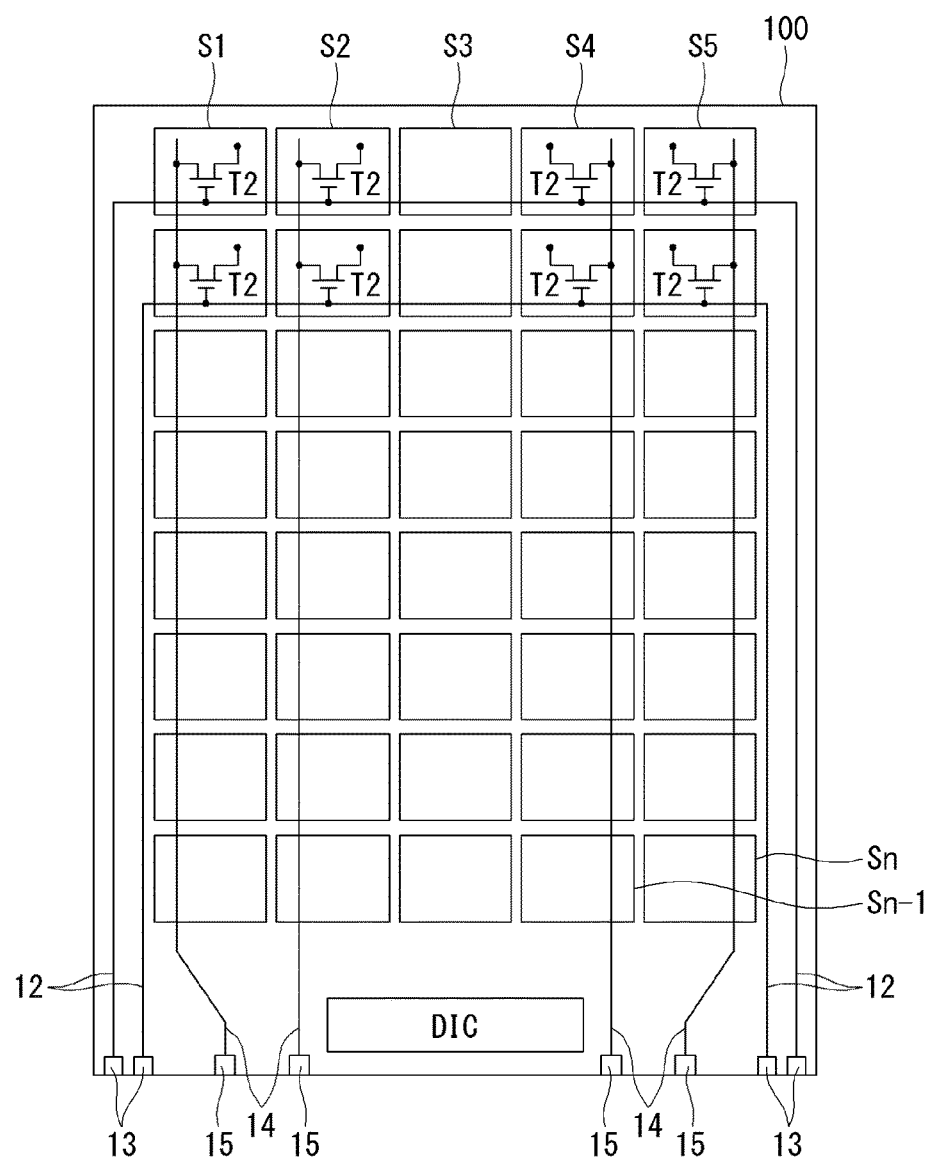
FIG. 4 is an equivalent circuit showing a touch sensor.

As shown in FIGS. 2 to 4, a display device according to the embodiment of the invention includes a touch screen embedded in a pixel array of a display panel 100.

The display device according to the embodiment of the invention includes display driving circuits 202, 204, and 206 for driving pixels of the display panel 100 and a touch sensing circuit 300 for driving touch sensors of the touch screen.

An input image is displayed on the pixel array of the display panel 100. The pixels of the pixel array are arranged in a matrix form defined by data lines D1 to Dm (where m is a positive integer) and gate lines G1 to Gn (where n is a positive integer). A thin film transistor (TFT) array substrate of the display panel 100 includes the plurality of data lines D1 to Dm, the plurality of gate lines G1 to Gn crossing the data lines D1 to Dm, pixel TFTs T1 formed at crossings of the data lines D1 to Dm and the gate lines G1 to Gn, pixel electrodes 1 which are connected to the data lines D1 to Dm through the pixel TFTs T1 and are charged to a data voltage, storage capacitors Cst which are connected to the pixel electrodes 1 and hold a voltage of liquid crystal cells, common electrodes 2 to which a common voltage Vcom is supplied, a plurality of touch sensors, and the like.

The pixel TFTs T1 are turned on in response to a gate pulse GP (refer to FIG. 6) from the gate lines G1 to Gn and supply the data voltage from the data lines D1 to Dm to the pixel electrodes 1. Gate electrodes of the pixel TFTs T1 are connected to the gate lines G1 to Gn. Drain electrodes of the pixel TFTs T1 are connected to the data lines D1 to Dm, and source electrodes of the pixel TFTs T1 are connected to the pixel electrodes 1. Each pixel is driven by an electric filed applied based on a voltage difference between the data voltage applied to the pixel electrode 1 and the common voltage Vcom applied to the common electrode 2 and adjusts a transmittance of light of the display panel 100. The pixel TFT T1 is turned on during a display driving period DP (refer to FIG. 6) and is held in an off-state during a touch sensing period TP (refer to FIG. 6).

Black matrixes, color filters, etc. are formed on a color filter substrate of the display panel 100. Polarizing plates are respectively attached to the TFT array substrate and the color filter substrate of the display panel 100. Alignment layers for setting a pre-tilt angle of liquid crystals are respectively formed on the inner surfaces contacting the liquid crystals in the TFT array substrate and the color filter substrate of the display panel 100. A column spacer is formed on a liquid crystal layer of the display panel 100 and keeps gaps between the liquid crystal cells constant.

The touch sensors are connected to the pixels of the TFT array substrate. The common electrode is divided as many as segment electrodes S1 to Sn of the touch sensors. The segment electrodes S1 to Sn are implemented as patterns divided from the common electrode 2. Thus, the segment electrodes S1 to Sn receive the common voltage Vcom during the display driving period DP and operate as the common electrodes 2. Further, the segment electrodes S1 to Sn receive a sensing pulse (refer to FIG. 6) during the touch sensing period TP and operate as the touch sensors.

Figure 5:
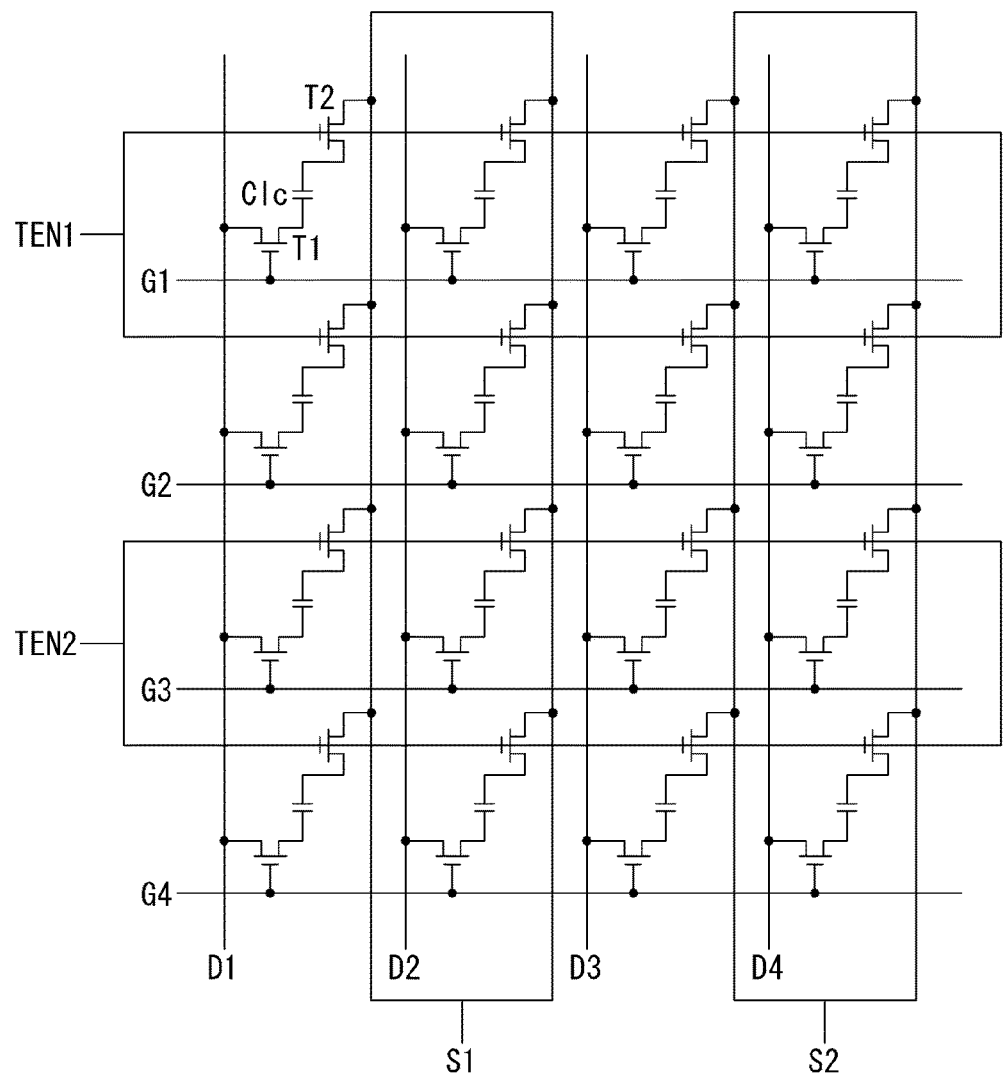
FIG. 5 is an equivalent circuit showing a connection structure between a touch sensor and a pixel.

As shown in FIG. 4, the plurality of segment electrodes S1 to Sn are connected to sensor enable lines 12 through sensor TFTs T2. The segment electrodes S1 to Sn are directly connected to sensor signal lines 14. The sensor enable lines 12 and the sensor signal lines 14 may be perpendicular to each other as shown in FIGS. 4 and 5.

The sensor TFT T2 is connected to the pixel, on which the input image is displayed. The sensor TFT T2 is connected to the pixel TFT T1 via the segment electrodes S1 to Sn, i.e., the common electrode and the pixel electrode 1. The sensor TFT T2 is held in an off-state during the display driving period DP. The sensor TFT T2 is turned on in response to a sensor enable pulse EN (refer to FIG. 6) from the sensor enable line 12 during the touch sensing period TP and supplies the sensing pulse to the segment electrodes S1 to Sn. A gate electrode of the sensor TFT T2 is connected to the sensor enable line 12. A drain electrode of the sensor TFT T2 is connected to the sensor signal line 14, and a source electrode of the sensor TFT T2 is connected to the segment electrodes S1 to Sn.

The display driving circuits 202, 204, and 206 apply data to the pixels during the display driving period DP. The display driving circuits 202, 204, and 206 include a data driving circuit 202, a gate driving circuit 204, and a timing controller 206. The display driving circuits 202, 204, and 206 may be integrated into one display driving integrated circuit (IC) DIC as shown in FIG. 4.

The data driving circuit 202 includes one or more source driver ICs. The data driving circuit 202 converts digital video data received from the timing controller 206 into a gamma compensation voltage during the display driving period DP and outputs the data voltage. The data voltage output from the data driving circuit 202 is supplied to the pixels through the data lines D1 to Dm. Output channels of the data driving circuit 202 may be held at the last data voltage, which was output during the display driving period DP prior to the touch sensing period TP, during the touch sensing period TP. Because the pixels are held at the last data voltage, which was charged during the display driving period DP, during the touch sensing period TP, the data is displayed on the pixels without generating changes in the voltage of the touch sensors.

The data driving circuit 202 may convert the output channels into a high impedance state under the control of the timing controller 206 during the touch sensing period TP. When the output channels of the data driving circuit 202 are controlled in the high impedance state, the output channels of the data driving circuit 202 are not connected to the data lines D1 to Dm. In this instance, the pixels are held at the last data voltage of the display driving period DP during the touch sensing period TP and display the data without generating changes in the voltage of the touch sensors.

The gate driving circuit 204 is driven under the control of the timing controller 206 during the display driving period DP and sequentially supplies the gate pulse GP synchronized with the data voltage to the gate lines G1 to Gn, thereby selecting lines of the display panel 100, to which the data of the input image is applied. The gate driving circuit 204 does not generate the gate pulse GP under the control of the timing controller 206 during the touch sensing period TP. Thus, the data driving circuit 202 and the gate driving circuit 204 do not generate a new output during the touch sensing period TP under the control of the timing controller 206.

The timing controller 206 transmits the digital video data RGB of the input image received from a host system (not shown) to the data driving circuit 202. Timing signals Vsync, Hsync, DE, and MCLK input to the timing controller 206 include a vertical sync signal Vsync, a horizontal sync signal Hsync, a data enable signal DE, and a main clock MCLK. The timing controller 206 generates timing control signals for controlling operation timings of the data driving circuit 202 and the scan driving circuit 204 using the timing signals Vsync, Hsync, DE, and MCLK.

The timing controller 206 generates a sync signal Tsync for time-dividing one frame period into the display driving period DP and the touch sensing period TP. The touch sensing circuit 300 is synchronized with the display driving circuits 202, 204, and 206 in response to the sync signal Tsync from the timing controller 206.

The host system may be implemented as one of a television system, a set-top box, a navigation system, a DVD player, a Blu-ray player, a personal computer (PC), a home theater system, and a phone system. The host system includes a system on chip (SoC) including a scaler embedded therein and thus converts the digital video data of the input image into a format suitable for displaying on the display panel 100. The host system transmits the digital video data and the timing signals Vsync, Hsync, DE, and MCLK to the timing controller 206. The host system runs an application associated with coordinate information of a touch input received from the touch sensing circuit 300.

The touch sensing circuit 300 supplies the sensing pulse to the sensor signal lines 14 during the touch sensing period TP and supplies the sensor enable pulse EN to the sensor enable lines 12 during the touch sensing period TP, thereby driving the touch sensors. The touch sensing circuit 300 converts a change amount of charges of the touch sensors received through the sensor signal lines 14 into digital values using an analog-to-digital converter (ADC) and generates touch raw data. The touch sensing circuit 300 compares the touch raw data with a predetermined threshold value and decides touch raw data greater than the predetermined threshold value as touch raw data obtained from the touch sensor of a touch input position. The touch sensing circuit 300 calculates coordinates of the touch input position and transmits the calculated coordinates to the host system.

The touch sensing circuit 300 includes at least one touch detection IC. The touch detection IC is connected to pads 13 formed at ends of the sensor enable lines 12 through a flexible print circuit (FPC). Further, the touch detection IC is connected to pads 15 formed at ends of the sensor signal lines 14 through the FPC.

Figure 6:
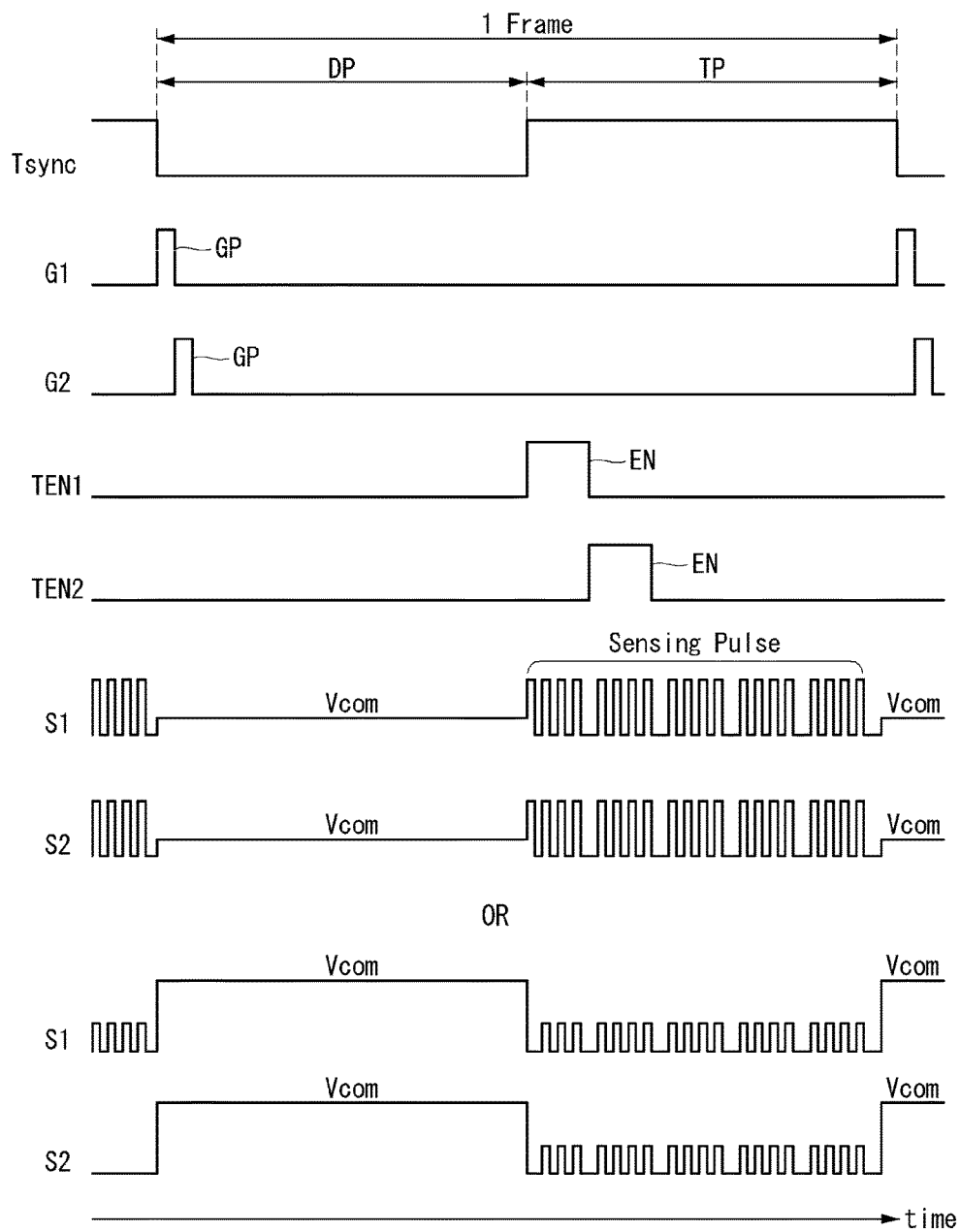
FIG. 6 is a waveform diagram showing a method for driving a touch sensing system according to an exemplary embodiment of the invention.

FIG. 5 is an equivalent circuit showing a connection structure between the touch sensor and the pixel. FIG. 6 shows signals applied to the touch sensor and the pixel.

As shown in FIGS. 5 and 6, one frame period is time-divided into the display driving period DP, in which the data of the input image is applied to the pixels, and the touch sensing period TP, in which the touch sensors are driven.

During the display driving period DP, the gate pulse GP applied to the gate lines G1 to Gn selects the pixels, to which the data voltage is applied. The data voltage of the input image is supplied to the data lines D1 to Dm during the display driving period DP.

During the touch sensing period TP, the sensor enable pulse EN applied to the sensor enable lines 12 selects the touch sensors, to which the sensing pulse is applied. A width of the sensor enable pulse EN is greater than a width of the gate pulse GP, so that charges may be sufficiently accumulated in an integrator of the touch sensing circuit 300 through sensing operations repeatedly performed by each touch sensor. The width of the sensor enable pulse EN may be set to be greater than the width of the gate pulse GP and a width of the sensing pulse.

As shown in FIG. 4, one sensor enable line 12 is commonly connected to the touch sensors on one line of the touch screen and thus may simultaneously select the touch sensors of one line. However, the embodiment of the invention is not limited thereto. For example, one sensor enable line 12 is commonly connected to the two or more touch sensors and may simultaneously select the two or more touch sensors. The sensor enable pulse EN is sequentially shifted in the same manner as the gate pulse GP. In FIGS. 5 and 6, 'TEN1' and 'TEN2' denote the first and second sensor enable lines 12, respectively.

The sensor signal line 14 receives the common voltage Vcom during the display driving period DP and thus operates as the common electrode. The sensor signal line 14 receives the sensing pulse during the touch sensing period TP and thus operates as the sensor segment. The sensing pulse may swing between a voltage greater than the common voltage Vcom and a voltage less than the common voltage Vcom. Further, a voltage of the sensing pulse may be set to be less than the common voltage Vcom. The sensing pulse is applied to the segment electrodes S1 to Sn through the sensor TFT T2, which is turned on during the touch sensing period TP. The form and the number of sensing pulses are not limited to FIG. 6.

Figure 7:
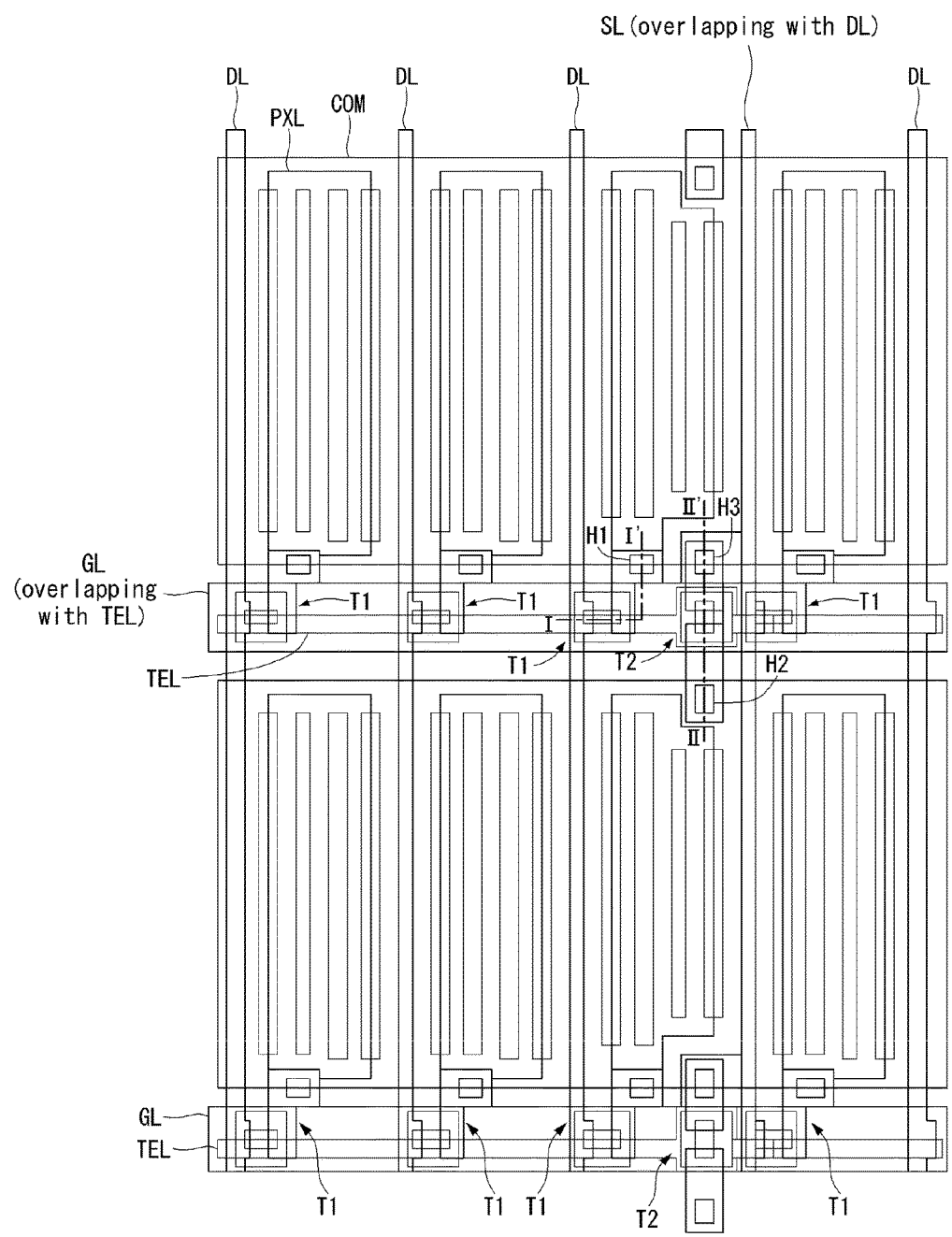
FIG. 7 is a plane view showing a pixel array in which touch sensors according to an exemplary embodiment of the invention are embedded.
Figure 8:
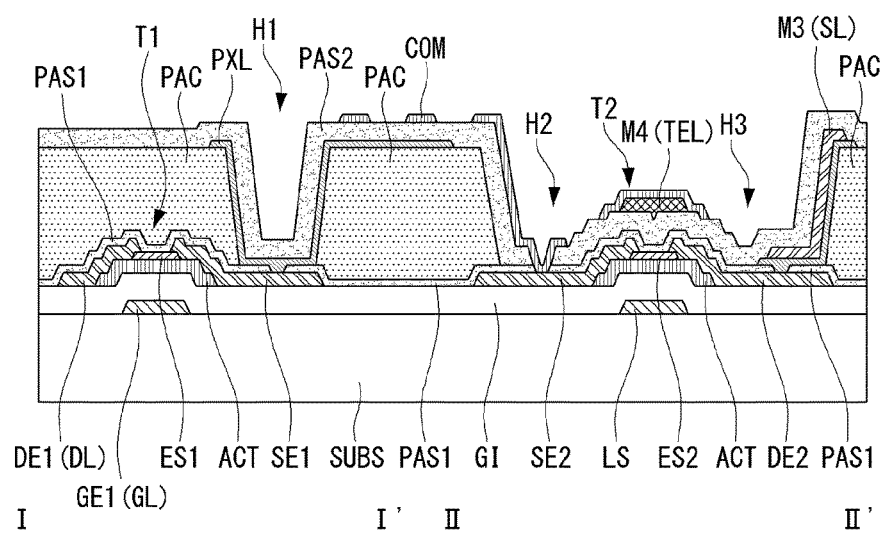
FIG. 8 is a cross-sectional view, which is taken along lines I-I' and II-II' of FIG. 7 and shows a cross-sectional structure of a touch sensor and a pixel.

FIG. 7 is a plane view showing the pixel array in which the touch sensors according to the embodiment of the invention are embedded. FIG. 8 is a cross-sectional view, which is taken along lines I-I' and II-II' of FIG. 7 and shows a cross-sectional structure of the touch sensor and the pixel.

As shown in FIGS. 7 and 8, the sensor enable line TEL overlaps the gate line GL, so that an aperture ratio of the pixel array is not reduced due to the lines of the touch sensor. The sensor signal line SL overlaps the data line DL.

The pixel TFT T1 may be implemented as a TFT of a bottom gate structure. The sensor TFT T2 may be implemented as a TFT of a top gate structure. At least one of the TFTs T1 and T2 may be applied to an oxide TFT using etch stoppers ES1 and ES2. The data line DL is formed using a second metal pattern. The sensor signal line SL includes a third metal pattern M3. The sensor enable line TEL and a gate electrode of the sensor TFT T2 each include a fourth metal pattern M4.

More specifically, first metal patterns are formed on a substrate SUBS. The first metal patterns include the gate line GL, a gate electrode GE1 of the pixel TFT T1 connected to the gate line GL, a light shield pattern LS of the sensor TFT T2, and the like. The light shield pattern LS reflects light irradiated onto a semiconductor pattern ACT of the sensor TFT T2 through the substrate SUBS, thereby preventing a malfunction of the sensor TFT T2 resulting from a photocurrent.

A gate insulating layer GI is formed of an insulating material, such as silicon nitride (SiNx), and covers the first metal patterns. The gate insulating layer GI insulates between the first metal patterns and the semiconductor patterns ACT and also insulates between the first metal patterns and second metal patterns.

The semiconductor patterns ACT of the pixel TFT T1 and the sensor TFT T2 are formed on the gate insulating layer GI. The semiconductor pattern ACT of the pixel TFT T1 overlaps a gate electrode GE1 of the pixel TFT T1 with the gate insulating layer GI interposed therebetween. The semiconductor pattern ACT of the sensor TFT T2 overlaps the light shield pattern LS underlying the gate insulating layer GI with the gate insulating layer GI interposed therebetween.

The etch stoppers ES1 and ES2 are formed in a channel part of the semiconductor pattern ACT. The etch stoppers ES1 and ES2 prevent channel parts of the TFTs Ti and T2 from being excessively etched by an etchant when the semiconductor pattern ACT is wet-etched. The etch stoppers ES1 and ES2 may be formed of inorganic insulating material.

The second metal patterns are formed on the gate insulating layer GI so as to cover the semiconductor patterns ACT. The second metal patterns include the data line DL, a drain electrode DE1 of the pixel TFT T1 connected to the data line DL, a source electrode SE1 of the pixel TFT T1, a drain electrode DE2 of the sensor TFT T2, a source electrode SE2 of the sensor TFT T2, and the like.

A first passivation layer PAS1 is formed of an insulating material, such as silicon nitride (SiNx), and covers the semiconductor patterns ACT and the second metal patterns DL, DE1, SE1, DE2, and SE2. A second passivation layer PAC is formed on the first passivation layer PAS1 using an organic insulating material such as photo-acryl.

First transparent electrode patterns are formed on the second passivation layer PAC using a transparent conductive material such as indium tin oxide (ITO). The first transparent electrode patterns include a pixel electrode PXL and a transparent electrode pattern of the sensor signal line SL. The pixel electrode PXL is connected to the source electrode SE1 of the pixel TFT T1 through a first contact hole H1 passing through the first and second passivation layers PAS1 and PAC.

The sensor signal line SL includes the transparent electrode pattern and the third metal pattern M3 formed on the transparent electrode pattern. The transparent electrode pattern of the sensor signal line SL is connected to the drain electrode DE2 of the sensor TFT T2 through a third contact hole H3 passing through the first passivation layer PAS1.

The sensor signal line SL is formed using the third metal pattern M3. The third metal pattern M3 is connected to a transparent electrode pattern underlying the third metal pattern M3. The transparent electrode pattern underlying the third metal pattern M3 forms the segment electrodes C1 to Cn. The third metal pattern M3 is formed of a metal having a resistance less than the transparent electrode pattern and may reduce a resistance of the sensor signal line SL.

A third passivation layer PAS2 is formed of an insulating material, such as silicon nitride (SiNx), and covers the first transparent electrode patterns and the second passivation layer PAC. The fourth metal pattern M4 is formed on the third passivation layer PAS2 and is connected to a gate electrode of the sensor TFT T2.

The sensor enable line TEL may be formed using the fourth metal pattern M4. The fourth metal pattern M4 may be formed of a metal having a resistance less than the transparent electrode pattern. The fourth metal pattern M4 and the gate electrode of the sensor TFT T2 are integrated.

Second transparent electrode patterns are formed on the third passivation layer PAS2 using a transparent conductive material such as indium tin oxide (ITO). The second transparent electrode patterns are formed on the fourth metal pattern M4 and contact the fourth metal pattern M4. The second transparent electrode patterns include a transparent electrode pattern covering the fourth metal pattern M4 and a common electrode COM (i.e., the segment electrodes S1 to Sn) of the pixel, to which the common voltage Vcom is supplied. The common electrode COM (i.e., the segment electrodes 51 to Sn) is connected to the source electrode SE2 of the sensor TFT T2 through a second contact hole H2 passing through the third passivation layer PAS2 and the first passivation layer PAS1.

As described above, the embodiment of the invention connects the sensor TFTs to the segment electrodes, simultaneously applies the sensor enable pulse to the gate electrodes of the plurality of sensor TFTs through the sensor enable lines, and applies the sensing pulse through the sensor signal lines connected to the segment electrodes. As a result, the embodiment of the invention may reduce the number of lines connected to the self capacitive sensors and sufficiently secure sensing time.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system, comprising:
   sensor signal lines connected to segment electrodes;
   sensor enable lines configured to receive a sensor enable pulse;
   sensor thin film transistors (TFTs) configured to be turned on in response to the sensor enable pulse; and
   a touch sensing circuit configured to apply the sensor enable pulse to the sensor enable lines, simultaneously turn on the two or more sensor TFTs, and apply the sensing pulse to the sensor signal lines,
   wherein the sensor TFTs and pixel TFTs are disposed on a same substrate,
   wherein each of the sensor TFTs is connected to a pixel on which an input image is displayed, and
   wherein the sensor TFTs are connected to the pixel TFTs, respectively, via the segment electrodes and a pixel electrode of the pixel.

2. The touch sensing system of claim 1, wherein the segment electrodes are formed using patterns obtained by dividing a common electrode for supplying a common voltage to pixels.

3. The touch sensing system of claim 2, wherein a voltage of the sensing pulse is less than the common voltage.

4. The touch sensing system of claim 2, wherein the sensing pulse swings between a voltage greater than the common voltage and a voltage less than the common voltage.

5. The touch sensing system of claim 2, wherein:
   the pixel electrode, to which a data voltage of the input image is applied; and
   the pixel TFT supplies a data voltage from a data line to the pixel electrode in response to a gate pulse from gate lines.

6. The touch sensing system of claim 5, wherein each sensor TFT includes a gate electrode connected to the sensor enable line, a drain electrode connected to the sensor signal line, and a source electrode connected to the sensor segment, wherein the pixel TFT includes a gate electrode connected to the gate line, a drain electrode connected to the data line, and a source electrode connected to the pixel electrode.

7. The touch sensing system of claim 6, wherein the sensor enable lines overlap the gate lines, wherein the sensor signal lines overlap the data lines.

8. The touch sensing system of claim 6, further comprising:

first metal patterns formed on a substrate;

a gate insulating layer which is formed on the substrate and covers the first metal patterns;

semiconductor patterns of the pixel TFT and the sensor TFT which are formed on the gate insulating layer so that the semiconductor patterns overlap the gate electrode of the pixel TFT and the gate electrode of the sensor TFT;

etch stoppers formed in channel parts of the semiconductor patterns;

second metal patterns which are formed on the gate insulating layer so as to cover the semiconductor patterns;

a first passivation layer configured to cover the semiconductor patterns and the second metal patterns;

a second passivation layer configured to cover the first passivation layer;

first transparent electrode patterns formed on the second passivation layer;

a third passivation layer configured to cover the first transparent electrode patterns and the second passivation layer;

a fourth metal pattern formed which is formed on the third passivation layer and is connected to the gate electrode of the sensor TFT; and second transparent electrode patterns which contact the fourth metal pattern and are formed on the third passivation layer wherein the first metal patterns include the gate line, the gate electrode of the pixel TFT connected to the gate line, and a light shield pattern of the sensor TFT, wherein the second metal patterns include the data line, the drain electrode of the pixel TFT connected to the data line, the source electrode of the pixel TFT, the drain electrode of the sensor TFT, and the source electrode of the sensor TFT, wherein the first transparent electrode patterns include the pixel electrode and a transparent electrode pattern of the sensor signal line, wherein the second transparent electrode patterns include the segment electrodes and a transparent electrode pattern covering the fourth metal pattern.

9. The touch sensing system of claim 8, wherein the sensor signal line includes a portion of the first transparent electrode patterns and a third metal pattern formed on the first transparent electrode patterns, wherein the fourth metal pattern includes the sensor enable line.

10. The touch sensing system of claim 9, wherein the pixel electrode is connected to the source electrode of the pixel TFT through a first contact hole passing through the first passivation layer and the second passivation layer, wherein the segment electrodes are connected to the source electrode of the sensor TFT through a second contact hole passing through the third passivation layer and the first passivation layer, wherein the transparent electrode pattern of the sensor signal line is connected to the drain electrode of the sensor TFT through a third contact hole passing through the first passivation layer.

11. The touch sensing system of claim 6, wherein a width of the sensor enable pulse is greater than a width of the gate pulse.

12. The touch sensing system of claim 11, wherein one frame period is time-divided into a display driving period, in which the common voltage is supplied to the segment electrodes and data of the input image is applied to the pixels, and a touch sensing period, in which the sensing pulse is supplied to the segment electrodes and a touch input is sensed, wherein the sensor TFT is turned on during the touch sensing period and is held in an off-state during the display driving period, wherein the pixel TFT is turned on during the display driving period and is held in an off-state during the touch sensing period.

13. The touch sensing system of claim 12, wherein the common voltage is supplied to the sensor signal lines during the display driving period, wherein the sensing pulse is supplied to the sensor signal lines during the touch sensing period.

14. The touch sensing system of claim 11, wherein at least one of the sensor TFT and the pixel TFT is an oxide TFT, wherein the sensor TFT is a TFT of a top gate structure, wherein the pixel TFT is a TFT of a bottom gate structure.

15. A touch sensing system, comprising:

sensor signal lines connected to segment electrodes;

sensor enable lines configured to receive a sensor enable pulse;

sensor thin film transistors (TFTs) configured to be turned on in response to the sensor enable pulse and supply a sensing pulse from the sensor signal lines to the segment electrodes; and a touch sensing circuit configured to apply the sensor enable pulse to the sensor enable lines, simultaneously turn on the two or more sensor TFTs, and apply the sensing pulse to the sensor signal lines, wherein the segment electrodes are formed using patterns obtained by dividing a common electrode for supplying a common voltage to pixels, and wherein the sensing pulse swings between a voltage greater than the common voltage and a voltage less than the common voltage.

* * * * *